US011286796B2

United States Patent
McCaffrey

(10) Patent No.: US 11,286,796 B2
(45) Date of Patent: Mar. 29, 2022

(54) COOLED ATTACHMENT SLEEVE FOR A CERAMIC MATRIX COMPOSITE ROTOR BLADE

(71) Applicant: United Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 407 days.

(21) Appl. No.: 16/406,294

(22) Filed: May 8, 2019

(65) Prior Publication Data

US 2020/0355084 A1 Nov. 12, 2020

(51) Int. Cl.
*F01D 5/30* (2006.01)
*F01D 11/00* (2006.01)
*B33Y 80/00* (2015.01)

(52) U.S. Cl.
CPC ......... *F01D 5/3092* (2013.01); *F01D 5/3007* (2013.01); *F01D 5/3084* (2013.01); *F01D 11/006* (2013.01); *B33Y 80/00* (2014.12); *F05D 2240/57* (2013.01); *F05D 2300/10* (2013.01); *F05D 2300/6033* (2013.01)

(58) Field of Classification Search
CPC ... F01D 5/14; F01D 5/147; F01D 5/28; F01D 5/282; F01D 5/284; F01D 5/30; F01D 5/3007; F01D 5/3015; F01D 5/3084; F01D 5/3092; F01D 11/006; F01D 25/08; F01D 25/12; B33Y 80/00; F05D 2240/57; F05D 2300/10; F05D 2300/6033
See application file for complete search history.

(56) References Cited

U.S. PATENT DOCUMENTS

| 5,368,444 | A | * | 11/1994 | Anderson | ............. F01D 5/3007 416/220 R |
| 6,290,466 | B1 | | 9/2001 | Ravenhall et al. | |
| 8,206,118 | B2 | | 6/2012 | Propheter-Hinckley et al. | |
| 9,103,220 | B2 | | 8/2015 | Garin et al. | |
| 9,410,439 | B2 | | 8/2016 | Luczak | |
| 10,024,173 | B2 | | 7/2018 | McCaffrey | |
| 2012/0163978 | A1 | * | 6/2012 | Darkins, Jr. | .......... F01D 5/3084 416/179 |
| 2013/0052020 | A1 | * | 2/2013 | Noble | ....................... F01D 5/22 416/193 A |
| 2014/0234117 | A1 | * | 8/2014 | Cairo | .................... F01D 5/3084 416/241 R |
| 2016/0222802 | A1 | | 8/2016 | Holowczak et al. | |
| 2016/0333889 | A1 | | 11/2016 | Kray et al. | |
| 2018/0340429 | A1 | | 11/2018 | Kittleson et al. | |

FOREIGN PATENT DOCUMENTS

JP 63173801 A 7/1988

OTHER PUBLICATIONS

JP63173801A_Translation (Itou, H.) Jul. 18, 1988. [received on Jan. 29, 2021] Received from: STIC (Year: 1988).*

* cited by examiner

*Primary Examiner* — Christopher Verdier
*Assistant Examiner* — Elton K Wong
(74) *Attorney, Agent, or Firm* — Bachman & LaPointe, P.C.

(57) ABSTRACT

A rotor disk assembly for a gas turbine engine includes a rotor disk with a multiple of blade slots, the rotor disk defined about an axis; a sleeve received within each of the multiple of blade slots; and a ceramic matrix composite rotor blade received within each of the multiple of sleeves.

18 Claims, 6 Drawing Sheets

COOLED ATTACHMENT SLEEVE FOR A CERAMIC MATRIX COMPOSITE ROTOR BLADE

BACKGROUND

The present disclosure relates to ceramic matrix composite (CMC) turbine blade assemblies, and more particularly, to a sleeve therefor.

Gas turbine engines, such as those which power modern commercial and military aircraft, include a compressor section, combustor section and turbine section arranged longitudinally around the engine centerline so as to provide an annular gas flow path. The compressor section compresses incoming atmospheric gases that are then mixed with a combustible fuel product and burned in the combustor section to produce a high energy exhaust gas stream. The turbine section extracts power from the exhaust gas stream to drive the compressor section. The exhaust gas stream produces forward thrust as it rearwardly exits the turbine section. Some engines may include a fan section, which is also driven by the turbine section, to produce bypass thrust.

Gas path components, such as turbine blades manufactured of nickel-based super alloys that operate in the high temperatures encountered by aerospace and gas turbine engines, typically include airfoil cooling that may be accomplished by external film cooling, internal air impingement, and forced convection, either separately, or in combination. More recently, ceramic matrix composite (CMC) rotor blades have the potential to operate in the high temperatures without airfoil cooling.

To utilize the high temperature capabilities, CMC rotor blades often utilize a relatively long neck region to separate the hot (e.g., about 2400-2700 F (1316-1482 C)) airfoil section of the rotor blade from the root section of the rotor blade that operates at relatively lower temperatures (e.g., about 1300 F (704 C)) due to the relatively high conductivity of the CMC materials, which conducts heat from the airfoil section, into the neck section, then into the root section which is in contact with the nickel-based super alloy rotor disk.

Relatively long rotor blades necks may be undesirable, however, due to the significant radial tension on the rotating rotor blade. The CMC blades are also highly orthotropic, and bending from the dovetail pressure contact faces may induce a moment that may pry apart the plies in the neck region perpendicular to the radial loading direction. Alternatively, the root section in the CMC rotor blade can be aggressively cooled, but this may cause a relatively large thermal gradient in the CMC rotor blades which may cause unacceptable thermal stresses in the CMC and potentially cause excessive interlaminar stresses.

SUMMARY

A rotor blade assembly for a gas turbine engine according to one disclosed non-limiting embodiment of the present disclosure includes a ceramic matrix composite rotor blade comprising a root; and a sleeve received at least partially around the root.

A further aspect of the present disclosure includes that the sleeve is manufactured of a metal alloy.

A further aspect of the present disclosure includes that the sleeve is additively manufactured of a metal alloy.

A further aspect of the present disclosure includes a multiple of passages through the sleeve.

A further aspect of the present disclosure includes a single inlet to the multiple of passages.

A further aspect of the present disclosure includes that the sleeve comprises an upstream circumferential extension and a downstream circumferential extension.

A further aspect of the present disclosure includes that the circumferential extension of one sleeve overlaps the circumferential extension of an adjacent sleeve.

A further aspect of the present disclosure includes that the sleeve comprises a first sleeve portion and a second sleeve portion that are located adjacent a shoulder portion of the root.

A further aspect of the present disclosure includes that a platform extends from the root and an airfoil extends from the platform.

A rotor assembly for a gas turbine engine according to one disclosed non-limiting embodiment of the present disclosure includes a rotor disk with a multiple of blade slots, the rotor disk defined about an axis; a sleeve received within each of the multiple of blade slots, each sleeve includes a multiple of passages through the sleeve; and a ceramic matrix composite rotor blade received within at least one of the multiple of sleeves.

A further aspect of the present disclosure includes that the multiple of passages are generally parallel to the axis.

A further aspect of the present disclosure includes a single inlet to the multiple of passages.

A further aspect of the present disclosure includes that the sleeve comprises an upstream circumferential extension and a downstream circumferential extension.

A further aspect of the present disclosure includes that the circumferential extension of one sleeve overlaps the circumferential extension of an adjacent sleeve to shield a rim of the rotor disk.

A further aspect of the present disclosure includes that the sleeve comprises a first sleeve portion and a second sleeve portion that are located at a contact region between the root and the blade slot.

A rotor assembly for a gas turbine engine according to one disclosed non-limiting embodiment of the present disclosure includes a rotor disk with a multiple of blade slots, the rotor disk defined about an axis; a sleeve received within at least one of the multiple of blade slots, wherein the sleeve comprises an upstream circumferential extension and a downstream circumferential extension, one of the upstream circumferential extension and the downstream circumferential extension overlaps the associated one of an adjacent upstream circumferential extension or the downstream circumferential extension of an adjacent sleeve to shield a rim of the rotor disk; and.

A further aspect of the present disclosure includes a multiple of passages through each sleeve.

A further aspect of the present disclosure includes that the multiple of passages are generally parallel to the axis.

A further aspect of the present disclosure includes a single inlet to the multiple of passages.

A further aspect of the present disclosure includes that each sleeve surrounds the root of the ceramic matrix composite rotor blade.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
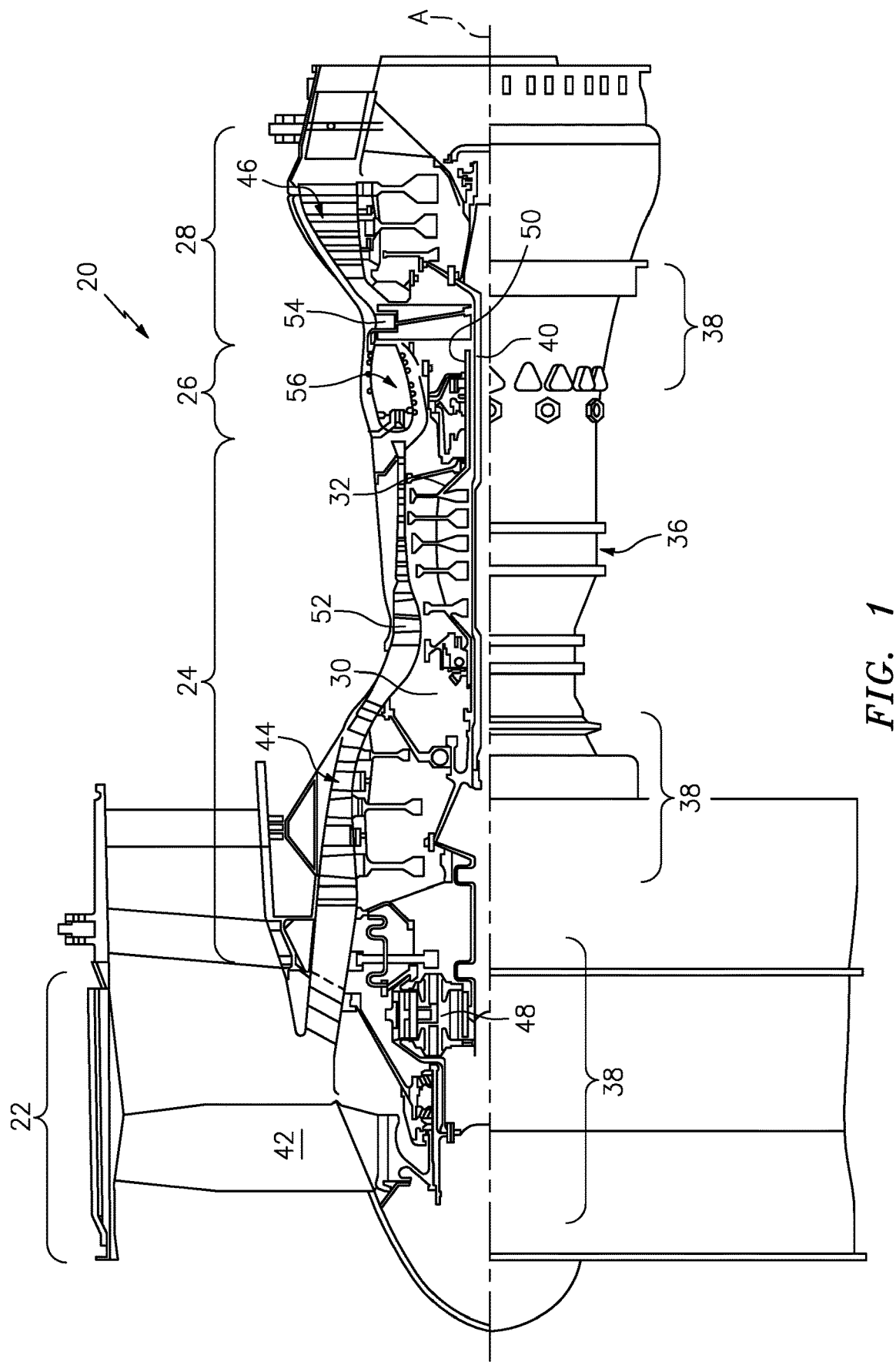
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a high temperature core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
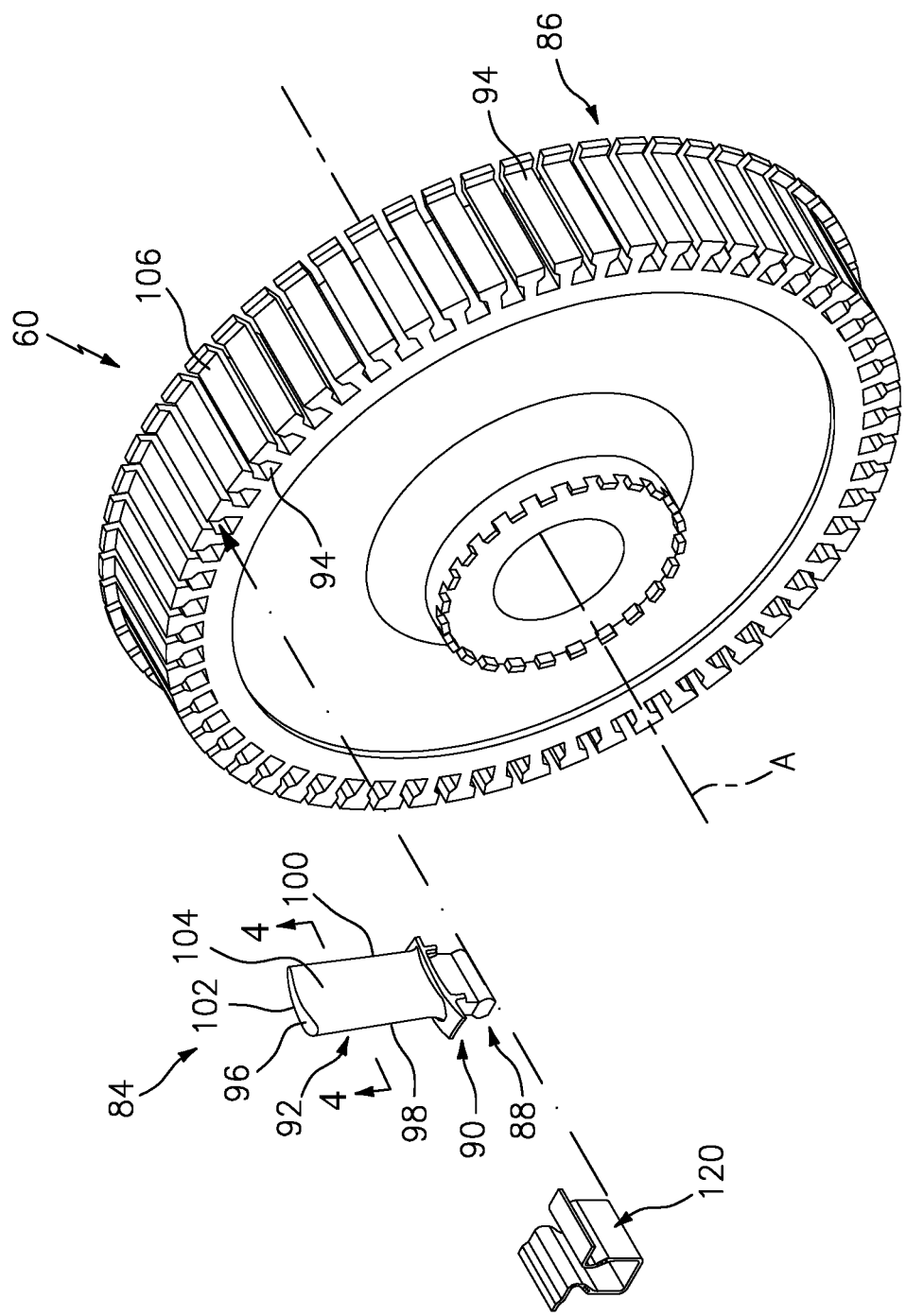
FIG. 2 is an exploded view of a rotor assembly with a single representative ceramic matrix composite turbine blade.

With reference to FIG. 2, a rotor assembly 60 such as a turbine rotor assembly includes an array of blades 84 (one shown) circumferentially disposed around a disk 86. The disk 86 may be subtractive or additive manufactured of nickel-based super alloys that operate in high temperature environments, such as, for example, environments typically encountered by aerospace and gas turbine engine hot section components. In some embodiments, the nickel-based alloy may be Inconel 718, Waspaloy, IN-100, ME-16.

Each blade 84 includes a root 88, a platform 90 and an airfoil 92. The platform 90 separates a gas path side inclusive of the airfoil 92 and a non-gas path side inclusive of the root 88. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Each blade root 88 is received within a respective blade slot 94 in a rim 106 of the disk 86 such that the airfoil 92 extends therefrom. In one example, the blade root 88 is generally teardrop shaped. However, other shapes such as fir-trees, flared, and other shapes are contemplated.

Each blade 84 may be manufactured of a ceramic matrix composite (CMC) material that typically includes laying up pre-impregnated composite fibers having a matrix material already present (prepreg) to form the geometry of the part (pre-form), autoclaving and burning out the pre-form, infiltrating the burned-out pre-form with the melting matrix material, and any machining or further treatments of the pre-form. Infiltrating the pre-form may include depositing the ceramic matrix out of a gas mixture, pyrolyzing a pre-ceramic polymer, chemically reacting elements, sintering, generally in the temperature range of 1700-3000 F (925-1650 C), or electrophoretically depositing a ceramic powder. With respect to turbine airfoils, the CMC may be located over a metal spar to form only the outer surface of the airfoil. Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3/Al_2O_3$), or combinations thereof. The CMC may have increased elongation, fracture toughness, thermal shock, dynamic load capability, and anisotropic properties as compared to a monolithic ceramic structure.

To resist the high temperature environment in the core gas path of the turbine engine being communicated from the blades 84 manufactured of the CMC material to the rotor disk 86, a sleeve 120 is located between each blade root 88 and the respective blade slot 94. The sleeve 120 may be subtractive or additive manufactured of CMC materials, ceramics, cobalt based alloys such as Haynes 25, Haynes 188, MAR-M-503, nickel alloys such as Inco 625 or Hastelloy X, or others that operate in high temperature environments, such as, for example, environments typically encountered by aerospace and gas turbine engine hot section components. The additive manufacturing process sequentially builds-up layers of atomized alloy and/or ceramic powder material.

Figure 3:
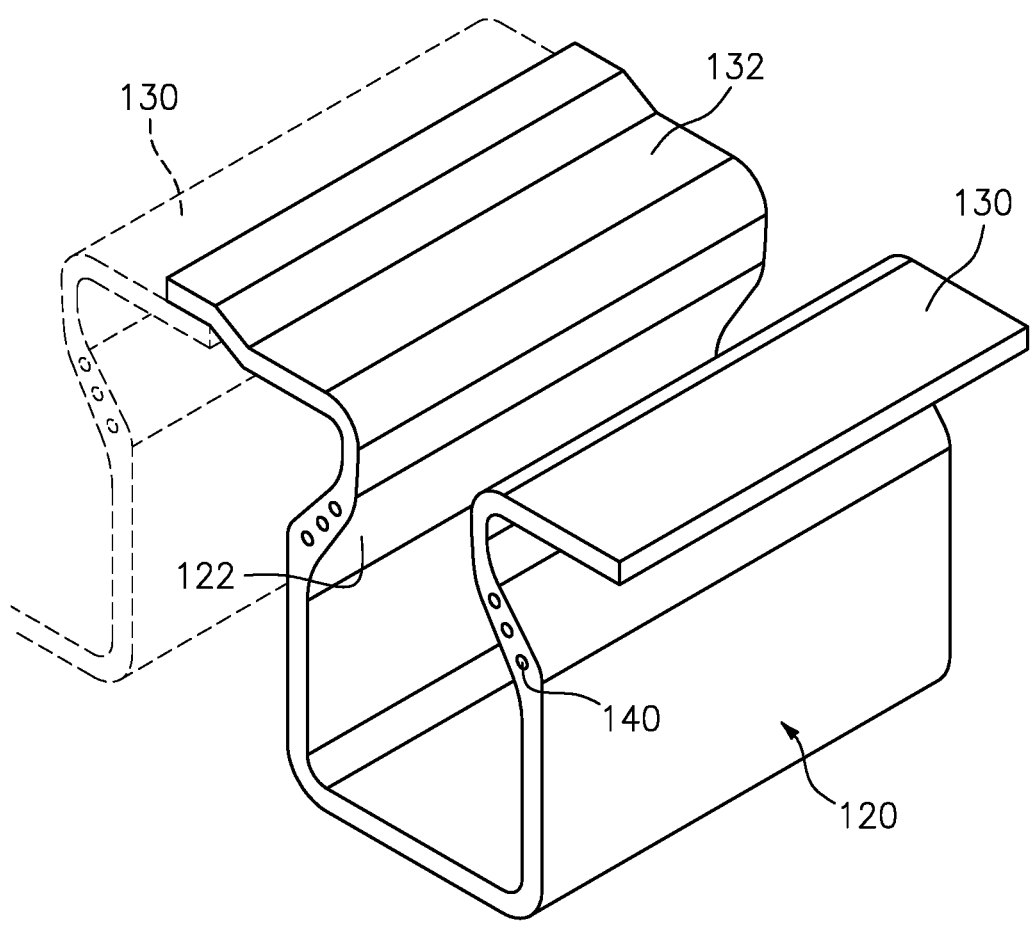
FIG. 3 is a perspective view of a sleeve according to one disclosed non-limiting embodiment for an example ceramic matrix composite turbine blade assembly of the gas turbine engine.
Figure 4:
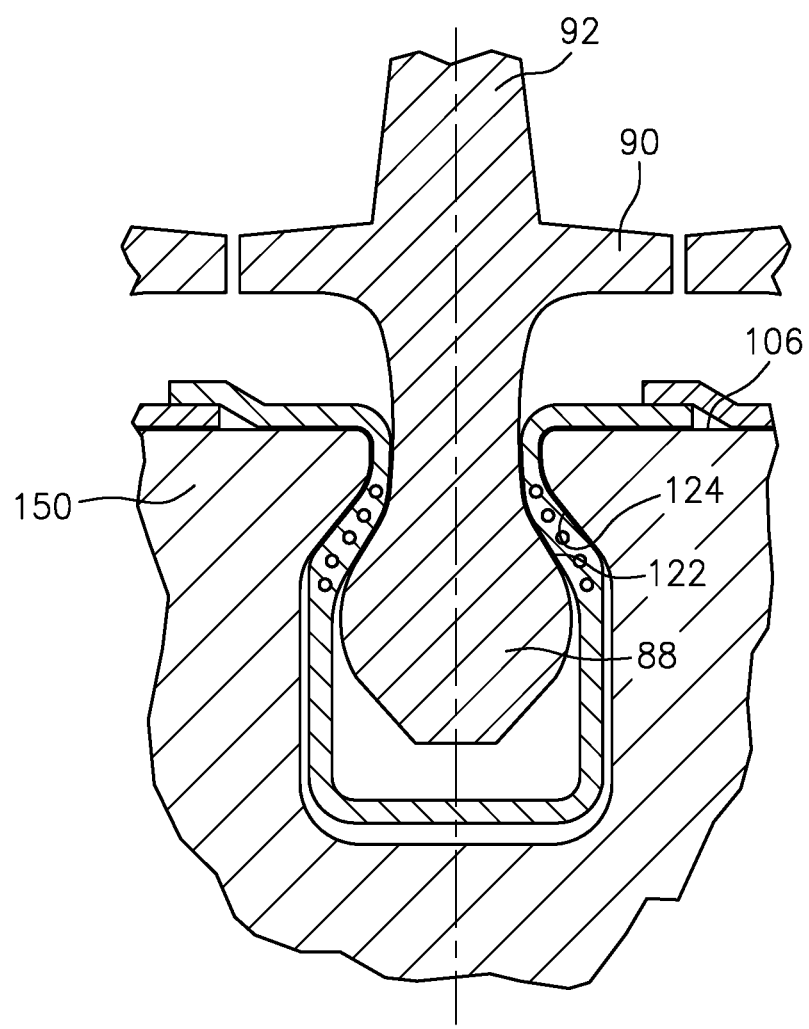
FIG. 4 is a front view of the sleeve for an example ceramic matrix composite turbine blade assembly of the gas turbine engine.

With reference to FIG. 3, in one embodiment, the sleeve 120 wraps around the blade root 88 (FIG. 4) and is sandwiched between an outer surface 122 of each blade root 88 and an inner surface 124 of the respective blade slot 94. Each sleeve 120 may additionally include an upstream circumferential extension 130 and a downstream circumferential extension 132. The downstream circumferential extension 132 of one sleeve overlaps the upstream circumferential extension 130 of the adjacent sleeve 120 such that the rim 106 of the rotor disk 86 is shielded from the high temperature environment in the core gas path.

Figure 6:
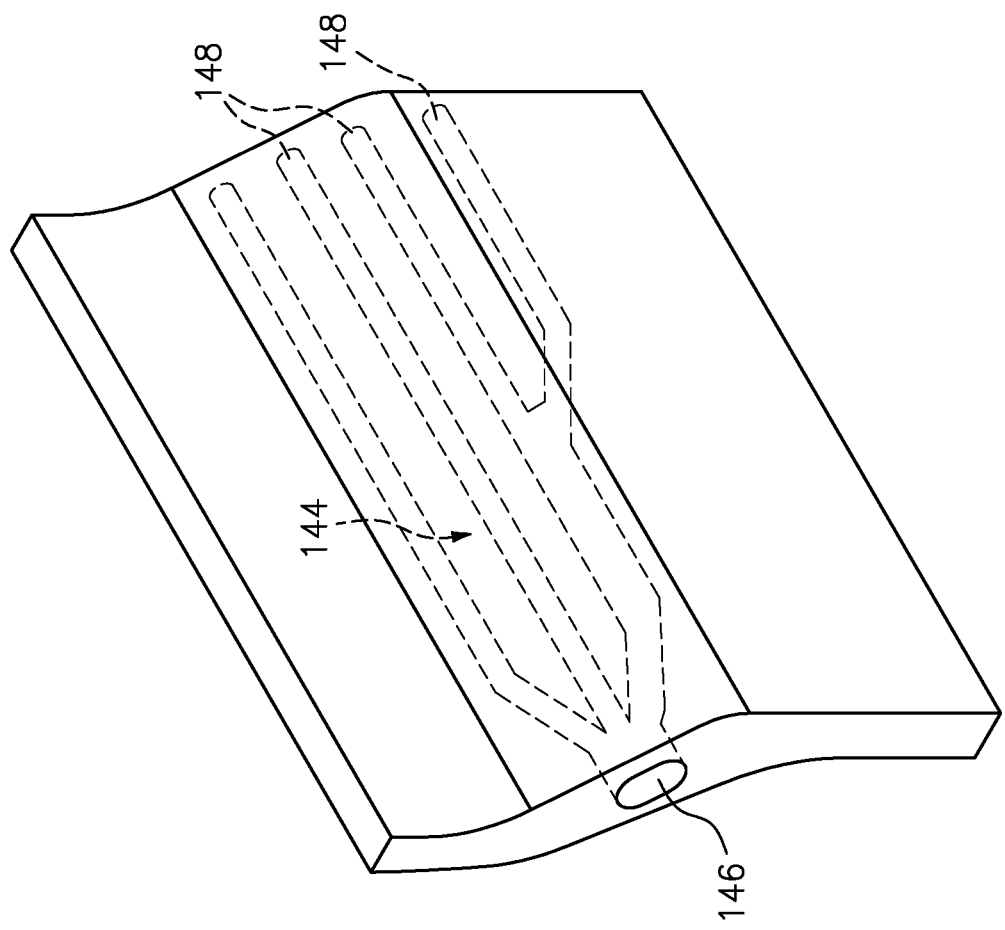
FIG. 6 is a perspective view of a cooling passage arrangement for a sleeve according to another disclosed non-limiting embodiment.
Figure 5:
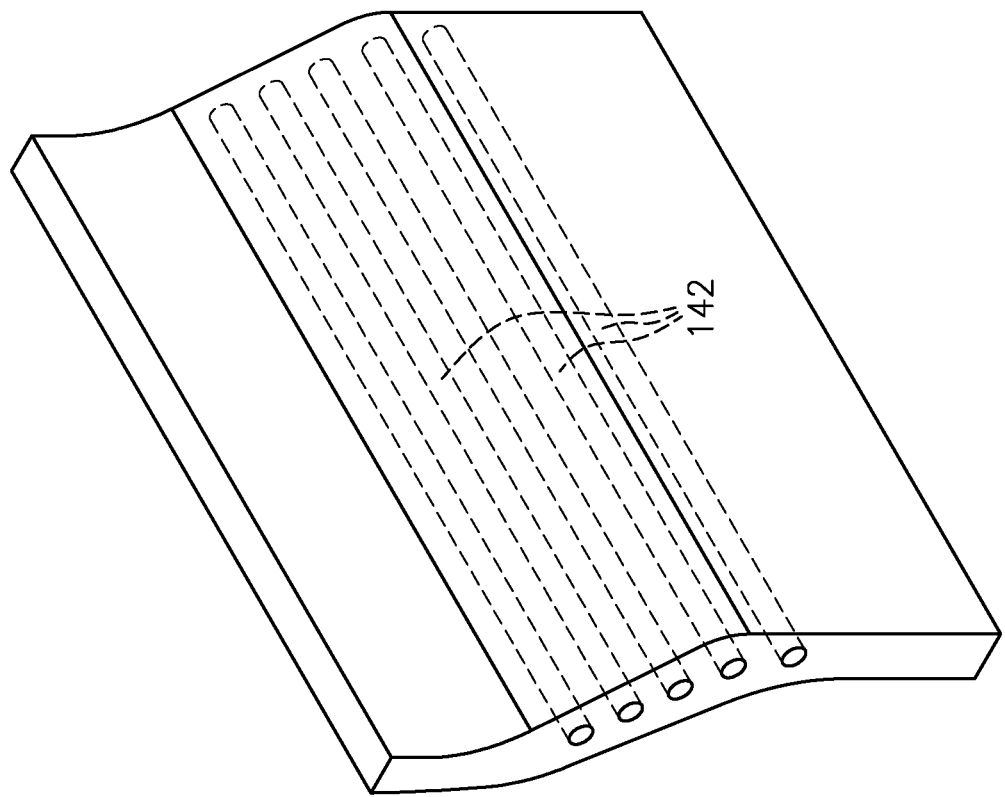
FIG. 5 is a perspective view of a cooling passage arrangement for a sleeve according to one disclosed non-limiting embodiment.

The sleeve 120 includes a multiple of passages 140 which permit cooling air to flow therethrough generally parallel to the engine axis A. The multiple of passages 140 may include separate individual passages 142 (FIG. 5), a branched passage 144 (FIG. 6) with a single inlet 146 that branches into multiple outlets 148, or combinations thereof. The air that shields the disk lug, may also be utilized to cool the extensions. That is, the circumferential extensions may be cooled via, for example, rim purge air without otherwise specific cooling features. The multiple of passages 140 permit the CMC blade root 88 to operate at a higher temperature, yet permit the disk lug 150 (FIG. 4) between each blade slot 94 to operate below about 1300 F. The multiple of passages 140 provided in the contact region remove heat, thus reducing the heat transfer into the disk lug 150. An increase to the permitted CMC blade root 88 temperatures reduces the overall thermal gradient in the CMC rotor blade to reduce the thermal stresses. Specifically shielding the disk lug from the hot CMC blade root 88 below the tensile creep of the material of the disk lug 150 also permits the disk lug 150 to remain within acceptable metal temperatures, with minimal cooling air usage.

Figure 7:
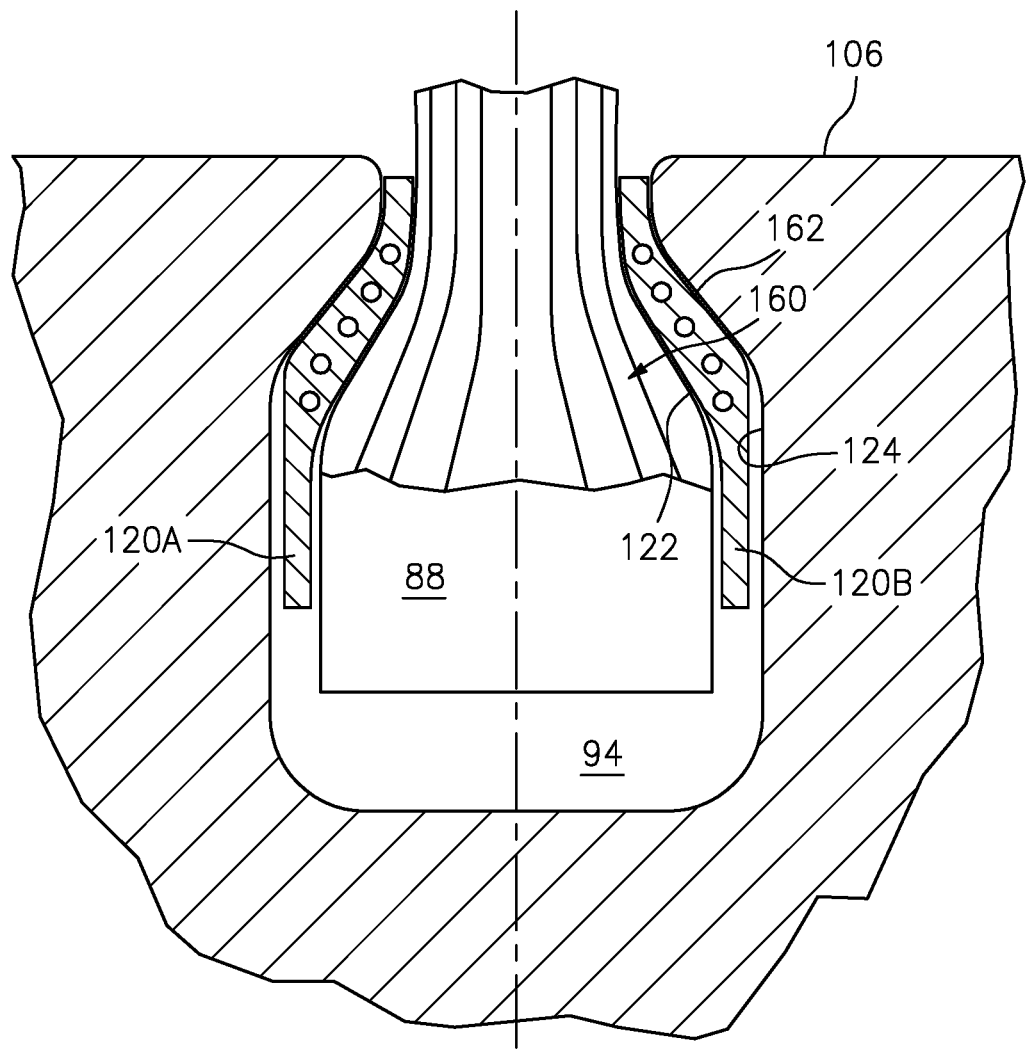
FIG. 7 is a perspective view of a sleeve according to another disclosed non-limiting embodiment for an example ceramic matrix composite turbine blade assembly of the gas turbine engine.

With reference to FIG. 7, in another embodiment, the sleeve 120 includes a first sleeve portion 120A and a second sleeve portion 120B that are respectively sandwiched between the outer surface 122 of each blade root 88 and the inner surface 124 of the respective blade slot 94. The first sleeve portion 120A and second sleeve portion 120B need only be located in the shoulder portion 160 of the interface at the contact region 162 either with or without circumferential extensions as discussed above.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. A rotor blade assembly for a gas turbine engine, comprising:
    a ceramic matrix composite rotor blade comprising a root, wherein a platform extends from the root and an airfoil extends from the platform; and
    a sleeve received at least partially around the root, wherein the sleeve comprises an upstream circumferential extension and a downstream circumferential extension with respect to a rotation thereof, the downstream circumferential extension of one sleeve overlaps the upstream circumferential extension of an adjacent sleeve.

2. The assembly as recited in claim 1, wherein the sleeve is manufactured of a metal alloy.

3. The assembly as recited in claim 1, wherein the sleeve is additively manufactured of a metal alloy.

4. The assembly as recited in claim 1, further comprising a multiple of passages through the sleeve.

5. The assembly as recited in claim 4, further comprising a single inlet to the multiple of passages.

6. The assembly as recited in claim 1, wherein the sleeve comprises a first sleeve portion and a second sleeve portion that are located only adjacent a shoulder portion of the root.

7. The assembly as recited in claim 6, the assembly further comprising a rotor disk with a multiple of blade slots, the ceramic matrix composite rotor blade received in a respective blade slot of the multiple of blade slots, wherein the first sleeve portion and the second sleeve portion are respectively sandwiched between an outer surface of the blade root and an inner surface of the respective blade slot.

8. The assembly as recited in claim 1, comprising a multiple of sleeves and a multiple of ceramic matrix composite rotor blades, wherein each respective one of the multiple of sleeves surrounds the entire root of each of the respective ceramic matrix composite rotor blades.

9. The assembly as recited in claim 1, wherein the platform is displaced from the sleeve.

10. The assembly as recited in claim 1, the assembly further comprising a rotor disk, wherein the platform is displaced from a rim of the rotor disk.

11. A rotor assembly for a gas turbine engine, comprising:
    a rotor disk with a multiple of blade slots, the rotor disk defined about an axis;
    a sleeve received within each of the multiple of blade slots, each sleeve comprises a multiple of passages through the sleeve, wherein each sleeve comprises an upstream circumferential extension and a downstream circumferential extension with respect to a rotation of the rotor disk, the downstream circumferential extension of one sleeve overlaps the upstream circumferential extension of an adjacent sleeve to shield a rim of the rotor disk; and
    a root of a ceramic matrix composite rotor blade received within at least one of the multiple of sleeves, wherein a platform extends from the root and an airfoil extends from the platform.

12. The assembly as recited in claim 11, wherein the multiple of passages are generally parallel to the axis.

13. The assembly as recited in claim 12, further comprising a single inlet to the multiple of passages.

14. The assembly as recited in claim 11, wherein the sleeve comprises a first sleeve portion and a second sleeve portion that are located only at a contact region between the root and the blade slot.

15. A rotor assembly for a gas turbine engine, comprising:
    a rotor disk with a multiple of blade slots, the rotor disk defined about an axis;
    a multiple of sleeves, each of the multiple of sleeves received within each one of the multiple of blade slots, wherein each sleeve comprises an upstream circumferential extension and a downstream circumferential extension with respect to a rotation of the rotor disk, one of the upstream circumferential extension and the downstream circumferential extension overlaps the associated one of an adjacent upstream circumferential extension or the downstream circumferential extension of an adjacent sleeve of the multiple of sleeves to shield a rim of the rotor disk; and a multiple of ceramic matrix composite rotor blades, a root of each of the ceramic matrix composite rotor blades received within one of the multiple of sleeves, a platform extends from the root and an airfoil extends from the platform.

16. The assembly as recited in claim 15, further comprising a multiple of passages through each sleeve.

17. The assembly as recited in claim 16, wherein the multiple of passages are generally parallel to the axis.

18. The assembly as recited in claim 17, further comprising a single inlet to the multiple of passages.

* * * * *